(12) United States Patent
Boetje et al.

(10) Patent No.: US 7,217,312 B2
(45) Date of Patent: May 15, 2007

(54) METHOD OF RECYCLING METALLIC COATED SCRAP PIECES

(75) Inventors: Jakob Boetje, TH Leek (NL); Patrik Schraven, Duisburg (DE)

(73) Assignees: Corus Aluminium Voerde GmbH, Voerde (DE); Aleris Aluminum Koblenz GmbH, Koblenz (DE)

( * ) Notice: Subject to any disclaimer, the term of this patent is extended or adjusted under 35 U.S.C. 154(b) by 177 days.

(21) Appl. No.: 10/475,176

(22) PCT Filed: Apr. 16, 2002

(86) PCT No.: PCT/EP02/04279

§ 371 (c)(1),
(2), (4) Date: May 12, 2004

(87) PCT Pub. No.: WO02/101102

PCT Pub. Date: Dec. 19, 2002

(65) Prior Publication Data

US 2004/0187642 A1    Sep. 30, 2004

(30) Foreign Application Priority Data

Apr. 24, 2001 (NL) .................................... 1017924
May 11, 2001 (EP) .................................. 01201753

(51) Int. Cl.
 *C22B 21/00*  (2006.01)
 *C22B 1/00*   (2006.01)

(52) U.S. Cl. ............................ 75/687; 75/392; 75/401; 75/686; 75/671

(58) Field of Classification Search .................. 75/401, 75/585, 672; 266/213
See application file for complete search history.

(56) References Cited

U.S. PATENT DOCUMENTS

| | | | |
|---|---|---|---|
| 5,122,181 A | * | 6/1992 | Dube et al. ................ 75/10.21 |
| 5,324,343 A | | 6/1994 | Foulard |
| 5,527,380 A | | 6/1996 | Gripenberg et al. |

FOREIGN PATENT DOCUMENTS

| | | |
|---|---|---|
| DE | 676941 | 8/1952 |
| EP | 0400925 | 12/1990 |
| GB | 2216640 | 10/1989 |
| JP | 06241868 | 3/1996 |
| WO | 9317135 | 9/1993 |
| WO | 9932260 | 1/1999 |
| WO | 0067942 | 11/2000 |

* cited by examiner

*Primary Examiner*—Roy King
*Assistant Examiner*—Kathleen McNelis
(74) *Attorney, Agent, or Firm*—Stevens, Davis, Miller & Mosher, LLP

(57) ABSTRACT

A method of recycling metallic coated scrap pieces wherein the coating layer liquidus temperature is lower than the core layer solidus temperature, such as brazing sheet scrap pieces, or metallic coated scrap pieces wherein the upper part of the melting range of the coating layer overlaps the lower part of the melting range of the core layer, by at least partially removing the coating layer from the core layer of the scrap pieces making use of a heat resistant metallurgical vessel having an opening for introducing the scrap pieces into the vessel and an exit for discharging essentially molten alloy. The vessel being rotatable around an axis of rotation.

29 Claims, No Drawings

METHOD OF RECYCLING METALLIC COATED SCRAP PIECES

The invention relates to a method of recycling metallic coated scrap pieces, such as brazing sheet scrap pieces, by removing the coating layer from the core layer of the scrap pieces. The invention also relates to the use of a metallurgical vessel for this recycling method.

Below the invention will be elucidated for brazing sheet scrap, but the method can be used as well for other types of metallic coating layers on a metal core.

During the production of brazing sheet a plate of an aluminium alloy having a relatively low Si content for the core of the brazing sheet is on one or both sides clad by means of roll bonding with a plate of an aluminium alloy having a high Si content for the clad layer on the core. This sandwich of core plate and clad plate(s) is subsequently rolled so as to bind the clad layer(s) to the core layer and to produce the brazing sheet product having a thickness of typically between 0.2 and 3 mm, for use in the production of for instance heat exchangers for automobiles.

During the production of the brazing sheet significant amounts of scrap is produced, for instance the beginnings and ends of the sandwich plates after each hot or cold rolling operation. Because the scrap contains both aluminium alloys with a high Si content and aluminium alloys with a low Si content, simple melting of the scrap would result in an aluminium alloy having a raised Si content as compared to the Si content of the core, which is to high to be used for producing similar type core plates, unless diluted with substantial amounts of alloys having a very low Si content.

Various methods are available to separate the clad alloy from the core alloy in the scrap. One of these methods is described in international application no. WO 00/67942. According to this method, the clad layer is separated from the core of the brazing sheet by heating the brazing sheet until the clad layer becomes liquid or semi-liquid but the core remains solid, and removing the clad layer by mechanical means such as a hand held or an automatically operated scraper. This method however is only suitable for individual pieces of about 50–75 mm thickness having a surface area per side of for instance 1 to 5 $m^2$; sheet of about 3 mm is too thin.

It is an object of the invention to provide an efficient method of recycling metallic coated scrap pieces, such as brazing sheet scrap, by removing the metallic coating from the core of the scrap pieces.

It is another object of the invention to provide a method of recycling metallic coated scrap such as brazing sheet scrap, with which large amounts of scrap can be recycled.

It is still another object of the invention to provide a method of recycling such scrap with which a wide range of sheet thicknesses can be recycled.

It is yet another object of the invention to provide a method of recycling such scrap that is economical on an industrial scale.

It is a further object of the invention to provide recycled core and coating alloys, which can easily be used for the production of new sheet material.

According to a first aspect of the invention, one or more of these objects are reached with a method of recycling metallic coated scrap pieces of which the liquidus temperature of the coating layer is lower than the solidus temperature of the core layer, such as brazing sheet scrap pieces, or metallic coated scrap pieces of which the upper part of the melting range of the coating layer has an overlap with the lower part of the melting range of the core layer, by at least partially removing the coating layer from the core layer of the scrap pieces making use of a heat-resistant metallurgical vessel having an opening for introducing the scrap pieces into the vessel and exit means for discharging essentially molten alloy, the vessel being rotatable around an axis of rotation, the method comprising the sequential steps of:

filling the vessel with a load of scrap pieces;
  supplying an amount of energy to the vessel such that essentially all the scrap pieces reach a temperature above the solidus temperature of the coating layer;
  rotating the vessel during and/or after the supplying of the amount of energy for forming essentially molten alloy;
  removing the essentially molten alloy, having the composition of the coating layer of the scrap pieces mixed with small amounts of the core layer, through the exit means of the vessel;
  removing the remainder of the load from the vessel.

Using this method, a certain amount of energy is introduced for a certain amount of scrap, which amount of energy is just enough to have the coating layer melted in whole or at least in part. This amount of energy should be introduced in a certain limited time period, to prevent oxidation, and to minimise diffusion of Si from the coating layer into the core layer when brazing sheet scrap pieces are recycled. Of course the amount of energy has to depend on the percentage of the coating layer in the scrap pieces in relation to the total load. It is assumed that due to the rotation of the vessel, the scrap pieces abrade each other and thus remove the liquid or semi-liquid coating layer from the core layer in a fast and efficient manner. It is believed that the combined effect of temperature and rotation results in a very efficient removal of the coating layer from the core, without the need for additional abrading means. It is unavoidable that small amounts of the core layer will be abraded as well, so the molten alloy will consist for a small part of the core alloy.

Preferably, an amount of energy is supplied to the vessel such that essentially all the scrap pieces reach a temperature above the liquidus temperature of the coating layer. By introducing such an amount of energy, essentially the whole coating layer will melt and be removed from the core. Due to the higher temperature it can be expected that the molten alloy will contain higher amounts of the core alloy. Higher amounts of the core alloy could also be present because the liquidus temperature of the coating layer falls into the melting range of the core layer.

According to a preferred embodiment of the method, the remainder of the load is removed from the vessel by supplying a second amount of energy in the vessel to melt the remainder of the load to form a second essentially molten alloy, preferably while the vessel is rotated, and removing the second essentially molten alloy having the composition of the core layer of the scrap pieces mixed with the remainder of the coating layer. When used for brazing sheet scrap, in this way two separate streams of essentially molten aluminium alloy are poured out of the vessel, a first one with a high Si content mainly originating from the clad layer of the brazing sheet scrap, and a second one with a relatively low Si content mainly originating from the core layer of the brazing sheet scrap. Pouring out the aluminium alloy is an easy way to remove the aluminium alloy from the vessel, and it can be formed directly into ingots or piglets. The same holds, mutatis mutandis, for other types of metallic coated scrap.

Preferably, the inside lining of the vessel has been preheated before the vessel is filled with the load of metallic coated scrap pieces, for the recycling of brazing sheet scrap pieces preferably to a temperature of between 550° and 650°

C. and more preferred to a temperature of between 600° and 630° C. In this way the vessel itself already can be given the temperature necessary to melt the coating layer, and the energy introduced will be used to heat the scrap pieces and to melt the coating layer.

According to a preferred embodiment the vessel is tiltable and the vessel is tilted to pour out the essentially molten alloy through the opening. The opening of the vessel thus acts as exit means too and no separate exit means are necessary in the vessel.

Preferably, burning a fuel, preferably natural gas, with substantially pure oxygen, generates the energy in the vessel. By burning a fuel with substantially pure oxygen it is possible to supply a sufficient amount of energy in a very fast way, and using natural gas gives a very clean combustion, so the aluminium alloy will not be contaminated by for instance sulphur from liquid fuels.

According to a preferred embodiment of the method, the vessel is rotated during a time period after the amount of energy has been supplied and before the first molten alloy is removed. By using an ongoing period of rotation after the energy has been supplied, and before the first molten alloy is removed, it is assumed that a better energy distribution through the brazing sheet scrap is reached, resulting in a better removal of the clad layer from the core layer.

Preferably, a vessel is used having a useful volume of 3–20 $m^3$, preferably of approximately 5 $m^3$, which is rotated with a velocity of 0.2–10 rpm. For a vessel having such a volume, this rotational speed results in a good mixing and abrading of the brazing sheet scrap pieces.

It has been found that the method according to the invention can be used in particular for recycling brazing sheet scrap pieces having a core layer of the AA 6xxx or AA 3xxx type aluminium alloy, such as AA 6063, AA 6060, AA 3003, AA 3103 or AA 3005, and a clad layer of the AA 4xxx type aluminium alloy, such as AA 4343, AA 4047, AA 4004, or AA 4104. For these types, the Si content of the core is up to 0.6% and the Si content of the clad layer is 6.8 to 13%.

For the brazing sheet types mentioned above, the method according to the invention should preferably be used for scrap pieces having thicknesses of 0.2 to 100 mm, preferably approximately 0.5–15 mm and/or approximately 40–70 mm. The best results are obtained for thicker scrap, which is scrap having a thickness of about 5–70 mm.

Preferably the scrap pieces have a square surface area per side of up to 0.5 $m^2$, preferably of 0.01 to 0.25 $m^2$; the pieces thus having dimensions of approximately 10 to 50 cm. Scrap pieces with these dimensions mix well in the vessel, whereas too large dimensions may damage the refractory lining of the vessel during rotation and too small pieces of scrap will presumably melt in total or stick together without an abrading effect.

According to a preferred embodiment of the method, the vessel is preheated to a temperature of approximately 620° C., the vessel is filled with a load of 2 to 5 tons brazing sheet scrap pieces, and an amount of energy of 220–260 kilowatt-hour per ton brazing sheet scrap pieces, depending on the type and relative thickness of the clad layer, is supplied in the vessel before aluminium alloy is removed from the vessel. These data can be used for the brazing sheet types as mentioned above and result in a first amount of molten aluminium alloy having a Si content of almost half that of the original clad layer; of course part of the core layer of the scrap pieces is molten as well, especially at the edges of the scrap pieces. The remainder of the scrap will have a Si content that is higher than that of the original core layer, but far lower than a total mixture of clad and core layer. This is of course because it is impossible to remove the clad layer completely from the scrap pieces by melting and rotating.

Preferably in the above method, the scrap pieces are heated during a time period of 20 to 50 minutes, preferably approximately 40 minutes. It has been found that a heating period of approximately 40 minutes, depending on the load of scrap pieces, is optimal for heating and removing the clad layer of the scrap pieces. It is not necessary to introduce an equal amount of energy per minute.

According to a preferred embodiment of the method, a second amount of energy of 200–300 kilowatt-hour per ton of the remainder of the load is supplied in the vessel to melt the remainder of the load. The amount of energy added must of course be sufficient to melt all the remainder of the scrap; preferably the molten core is overheated for further processing in the casthouse without former solidification.

Preferably, the remainder of the load is heated during a time period of 20 to 40 minutes, preferably approximately 30 minutes. This is, depending on the original load, enough time to fully melt the core of the scrap pieces.

Optionally fluxing salts are added to the load of brazing sheet scrap pieces when filling the vessel. Such fluxing salts and their use are well known in the art.

According to a second aspect of the invention, use is made of a heat-resistant vessel having an opening and means for introducing energy into the vessel, the vessel being rotatable around an axis of rotation, and the vessel being preferably tiltable so as to be able to empty the vessel through the opening, for performing the above described method for recycling metallic coated scrap pieces. Such vessels are already in use for processing aluminium-containing dross at a temperature of approximately 850° C. It has been found that such vessels can very well be used for performing the method according to the present invention. A particular suitable metallurgical vessel is given in European patent EP 0 627 014 or U.S. Pat. No. 5,527,380, which documents are incorporated herein by reference.

According to a third aspect of the invention, the core alloy and/or clad alloy as recovered from brazing sheet scrap pieces by using the method as described above provide an aluminium alloy having a composition which makes especially the core alloy suitable for use in the production of new brazing sheet. Moreover, the core alloy and clad alloy are produced in a cost-effective and fast manner.

The invention also provides a product made from the core alloy and/or clad alloy as recovered by using the method as described above.

The invention will be illustrated by the following non-limitative examples.

EXAMPLE 1

In an industrial scale experiment, a mixture of pieces of brazing sheet scrap having a thickness of 6.5 mm and 14.5 mm has been used, the scrap pieces having a clad layer on both sides. The pieces had a length of approximately 290 mm and a width in the range of approximately 40 to 90 mm. The mass of the scrap pieces having a thickness of 6.5 mm was approximately equal to the mass of the scrap pieces having a thickness of 14.5 mm. The core sheet consisted of an aluminium alloy having a Si content of 0.1 to 0.19% and the clad layer of an aluminium alloy having a Si content of 9.54 to 9.94% on both sides of the core. The nominal percentage of the clad layer was approximately 24% of the total weight, so 12% on each side of the core layer.

A load of 3295 kg scrap was introduced in an industrial scale metallurgical vessel as described in European patent 0

627 014, which was preheated to a temperature of approximately 620° C. The vessel had an internal volume of approximately 5 m³. During a time period of approximately 33 minutes a total amount of energy of 790 kilowatt-hour was introduced in the vessel by burning natural gas with substantially pure oxygen in approximately a 50–50 ratio. During the first 10 minutes, 2.2 megawatt was introduced while the vessel rotated at 2 rpm; thereafter during 23 minutes 1.1 megawatt was introduced while the vessel rotated at 0.5 rpm.

After this treatment a total of 1110 kg aluminium alloy was poured out having a Si content of 4%.

Subsequently the remainder of the load in the vessel was heated with a total amount of 670 kilowatt-hour during a time period of approximately 25 minutes. First during 9 minutes 2.2 megawatt was introduced while the vessel rotated with 0.5 rpm. Then during 9 minutes 1.43 megawatt was introduced while the vessel rotated at 5 rpm, and during the last 7 minutes 1.1 megawatt was introduced while the vessel rotated at 0.5 rpm.

After this treatment 1980 kg aluminium alloy was poured out having a Si content of 0.67%.

Known fluxing salts were added.

EXAMPLE 2

In an industrial scale experiment, a mixture of pieces of brazing sheet scrap having a thickness of 6.5 mm and 14.5 mm has been used, the scrap pieces having a clad layer on both sides. The pieces had a length of approximately 290 mm and a width in the range of approximately 40 to 90 mm. The mass of the scrap pieces having a thickness of 6.5 mm was approximately equal to the mass of the scrap pieces having a thickness of 14.5 mm. The core sheet consisted of an aluminium alloy having a Si content of 0.1 to 0.19% and the clad layer of an aluminium alloy having a Si content of 9.54 to 9.94% on both sides of the core. The nominal percentage of the clad layer was approximately 24% of the total weight, so 12% on each side of the core layer.

A load of 4140 kg scrap was introduced in an industrial scale metallurgical vessel as described in European patent 0 627 014, which was preheated to a temperature of approximately 620° C. The vessel had an internal volume of approximately 5 m³. During a time period of approximately 43 minutes a total amount of energy of 970 kilowatt-hour was introduced in the vessel by burning natural gas with oxygen in approximately a 50–50 ratio. During the first 10 minutes, 2.2 megawatt was introduced while the vessel rotated at 2 rpm; thereafter during 33 minutes 1.1 megawatt was introduced while the vessel rotated at 0.5 rpm.

After this treatment a total of 645 kg aluminium alloy was poured out having a Si content of 5.3%.

Subsequently the remainder of the load in the vessel was heated with a total amount of 788 kilowatt-hour during a time period of approximately 30 minutes. First during 10 minutes 2.2 megawatt was introduced while the vessel rotated with 0.5 rpm. Then during 10 minutes 1.43 megawatt was introduced while the vessel rotated at 5 rpm, and during the last 10 minutes 1.1 megawatt was introduced while the vessel rotated at 0.5 rpm.

After this treatment 3205 kg aluminium alloy was poured out having a Si content of 1.1%.

Known fluxing salts were added.

EXAMPLE 3

In an industrial scale experiment, brazing sheet scrap pieces having a size of approximately 100×300×5 mm, were introduced in a vessel as described in European patent 0 627 014, preheated to a temperature of approximately 620° C., in a load of 2580 kg, together with known fluxing salts. A total amount of 469 kilowatt-hour was introduced.

During 25 minutes 208 kilowatt-hour pro ton was introduced, while the vessel was rotated at 0.5 rpm during 10 minutes, then at 1.0 rpm during 11 minutes, and at 3.0 rpm during 4 minutes. A first amount of 660 kg aluminium alloy was poured out, having a Si content of 4.92%.

After that during 32 minutes 240 kilowatt-hour pro ton was introduced, while the vessel rotated at 0.5 rpm during 10 minutes, at 2.0 rpm during the next 10 minutes, and at 5 rpm during the last 12 minutes. A second amount of 1860 kg aluminium alloy was poured out, having a Si content of 0.41%.

EXAMPLE 4

In an industrial scale experiment, brazing sheet scrap pieces having a size of approximately 300×300×50 mm were introduced in a vessel as described in European patent 0 627 014, preheated to a temperature of approximately 620° C., in a load of 4430 kg, together with known fluxing salts. A total amount of 1034 kilowatt-hour was introduced.

During 41 minutes 245 kilowatt-hour pro ton was introduced, while the vessel was rotated at 0.5 rpm during all 41 minutes. A first amount of 1500 kg aluminium alloy was poured out, having a Si content of 4.29%.

After that during 34 minutes 240 kilowatt-hour pro ton was introduced, while the vessel rotated at 0.5 rpm during 10 minutes, at 5 rpm during the next 10 minutes, and at 0.5 rpm during the last 14 minutes. A second amount of 2850 kg aluminium alloy was poured out, having a Si content of 0.52%.

EXAMPLE 5

In an industrial scale experiment, a mixture of brazing sheet scrap pieces having a thickness of 0.6 mm and a variable size in the order of magnitude of 100×300 mm was introduces in a vessel as described in European patent 0.627 014, preheated to a temperature of approximately 620° C., in a load of 1465 kg. All scrap pieces have a core of AA 3xxx (Si content less than 0.62%) and a clad layer of AA 4xxx (Si content of 7.2–12.65%). A total of 273 kilowatt-hour pro ton was introduced during 36 minutes while the vessel rotated at 2 rpm. A first amount of 285 kg aluminium alloy was poured out, having a Si content of 2.04%. A second amount of 1045 kg aluminium alloy was; after heating, poured out having a Si content of 1.00%.

Having now fully described the invention, it will be apparent to one of ordinary skill in the art that many changes and modifications can be made without departing from the spirit and scope of the invention as herein described.

The invention claimed is:

1. Method of recycling metallic coated scrap pieces of which the liqiuidus temperature of a coating layer is lower than the solidus temperature of a core layer, by at least partially removing the coating layer from the core layer of said scrap pieces making use of a heat resistant metallurgical vessel having an opening for introducing the scrap pieces into the vessel and an exit for discharging essentially molten alloy, the vessel being rotatable around an axis of rotation, the method comprising the sequential steps of:
   filling the vessel with a load of scrap pieces;
   supplying an amount of energy to the vessel such that essentially all the scrap pieces reach a temperature above the solidus temperature of the coating layer;

rotating the vessel during and/or after the supplying of the amount of energy for forming essentially molten alloy;

removing the essentially molten alloy, having the composition of the coating layer of the scrap pieces mixed with small amounts of the core layer, through the exit of the vessel;

removing the remainder of the load from the vessel, wherein the remainder of the load is removed from the vessel by supplying a second amount of energy in the vessel to melt the remainder of the load to form a second essentially molten alloy, and removing the second essentially molten alloy having the composition of the core layer of the scrap pieces mixed with the remainder of the coating layer.

2. Method according to claim 1, wherein an amount of energy is supplied to the vessel such that essentially all the scrap pieces reach a temperature above the liquidus temperature of the coating layer.

3. Method according to claim 1, wherein the inside lining of the vessel has been preheated before the vessel is filled with the load of metallic coated scrap pieces, for the recycling of brazing sheet scrap pieces.

4. Method according to claim 1, wherein the vessel is tiltable and the vessel is tilted to pour out the essentially molten alloy through the opening.

5. Method according to claim 1, wherein the energy in the vessel is generated by burning a fuel, with substantially pure oxygen.

6. Method according to claim 1, wherein the vessel is rotated during a time period after the amount of energy has been supplied and before the essentially molten alloy is removed.

7. Method according to claim 1, wherein a vessel is used having a useful volume of 3–20 m$^3$, is rotated with a velocity of 0.2–10 rpm.

8. Method according to claim 1, wherein the scrap pieces are recycled having a core layer of the AA 6xxx or AA 3xxx type aluminium alloy and a clad layer of the AA 4xxx type aluminium alloy.

9. Method according to claim 8, wherein the scrap pieces have thicknesses in the range of 0.2 to 100 mm.

10. Method according to claim 8, wherein the scrap pieces have a square surface area per side of up to 0.5 m$^2$.

11. Method according to claim 8, wherein the vessel is preheated to a temperature of approximately 620° C., the vessel is filled with a load of 2 to 5 tons brazing sheet scrap pieces, and an amount of energy of 220–260 kilowatt hour per ton brazing sheet scrap pieces, depending on the type and relative thickness of the clad layer, is supplied in the vessel before aluminium alloy is removed from the vessel.

12. Method according to claim 11, wherein the scrap pieces are heated during a time period of 20 to 50 minutes.

13. The method according to claim 1, wherein the metallurgical vessel is a dross-recycling converter.

14. The method of claim 1, wherein the metallic coated scrap pieces are selected from the group consisting of brazing sheet scrap pieces, or metallic coated scrap pieces of which the upper part of the melting range of the coating layer has an overlap with the lower part of the melting range of the core layer.

15. Method according to claim 1, wherein the inside lining of the vessel has been preheated before the vessel is filled with the load of metallic coated scrap pieces, for the recycling of brazing sheet scrap pieces to a temperature of between 550° and 650° C.

16. Method according to claim 1, wherein the inside lining of the vessel has been preheated before the vessel is filled with the load of metallic coated scrap pieces, for the recycling of brazing sheet scrap pieces to a temperature of between 600° and 630° C.

17. Method according to claim 1, wherein the energy in the vessel is generated by burning natural gas with substantially pure oxygen.

18. Method according to claim 1, wherein a vessel is used having a useful volume of approximately 5 m$^3$ is rotated with a velocity of 0.2–10 rpm.

19. Method according to claim 1, wherein brazing sheet scrap pieces are recycled having a core layer of selected from the group consisting of AA 6063, AA 6060, AA 3003, AA 3103 or AA 3005, and a clad layer selected from the group consisting of AA 4343, AA 4047, AA 4004, or AA 4104.

20. Method according to claim 8, wherein the scrap pieces have thicknesses in the range of 0.5–15 mm.

21. Method according to claim 8, wherein the scrap pieces have thicknesses of approximately 40–70 mm.

22. Method according to claim 8, wherein the scrap pieces have a square surface area per side of 0.01 to 0.25 m$^2$.

23. Method according to claim 11, wherein the scrap pieces are heated during a time period of approximately 40 minutes.

24. Method of recycling metallic coated scrap pieces of which the liqiuidus temperature of a coating layer is lower than the solidus temperature of a core layer, by at least partially removing the coating layer from the core layer of said scrap pieces making use of a heat resistant metallurgical vessel having an opening for introducing the scrap pieces into the vessel and an exit for discharging essentially molten alloy, the vessel being rotatable around an axis of rotation, the method comprising the sequential steps of:

filling the vessel with a load of scrap pieces;

supplying an amount of energy to the vessel such that essentially all the scrap pieces reach a temperature above the solidus temperature of the coating layer;

rotating the vessel during and/or after the supplying of the amount of energy for forming essentially molten alloy;

removing the essentially molten alloy, having the composition of the coating layer of the scrap pieces mixed with small amounts of the core layer, through the exit of the vessel;

removing the remainder of the load from the vessel;

wherein the brazing sheet scrap pieces are recycled having a core layer of the AA 6xxx or AA 3xxx type aluminium alloy and a clad layer of the AA 4xxx type aluminium alloy and, wherein a second amount of energy of 200–300 kilowatt-hour per ton of the remainder of the load is supplied in the vessel to melt the remainder of the load.

25. Method according to claim 24, wherein the remainder of the load is heated during a time period of 20 to 40 minutes.

26. Method according to claim 24, wherein fluxing salts are added to the load of scrap pieces when filling the vessel.

27. Method according to claim 24, wherein the remainder of the load is heated during a time period of approximately 30 minutes.

28. The method according to claim 24, wherein the vessel is tiltable to be able to empty the vessel through the opening, for performing the method for recycling metallic coated scrap pieces.

29. Method of recycling metallic coated scrap pieces of which the liguidus temperature of a coating layer is lower than the solidus temperature of a core layer, by at least partially removing the coating layer from the core layer of said scrap pieces making use of a heat resistant metallurgical vessel having an opening for introducing the scrap pieces into the vessel and an exit for discharging essentially molten alloy, the vessel being rotatable around an axis of rotation, the method comprising the sequential steps of:

filling the vessel with a load of scrap pieces;

supplying an amount of energy to the vessel such that essentially all the scrap pieces reach a temperature above the solidus temperature of the coating layer;

rotating the vessel during and/or after the supplying of the amount of energy for forming essentially molten alloy;

removing the essentially molten alloy, having the composition of the coating layer of the scrap pieces mixed with small amounts of the core layer, through the exit of the vessel;

removing the remainder of the load from the vessel, wherein the remainder of the load is removed from the vessel by supplying a second amount of energy in the vessel to melt the remainder of the load to form a second essentially molten alloy, while the vessel is rotated, and removing the second essentially molten alloy having the composition of the core layer of the scrap pieces mixed with the remainder of the coating layer.

* * * * *